Nov. 19, 1957 L. L. STEN Re. 24,392

LEG ATTACHMENT FOR BED SPRINGS

Original Filed June 14, 1955

INVENTOR
LEONARD L. STEN

BY Kimmel & Crowell
ATTORNEYS

United States Patent Office

Re. 24,392
Reissued Nov. 19, 1957

24,392

LEG ATTACHMENT FOR BED SPRINGS

Leonard L. Sten, Kingston, Pa.

Original No. 2,779,952, dated February 5, 1957, Serial No. 515,299, June 14, 1955. Application for reissue February 20, 1957, Serial No. 641,792

4 Claims. (Cl. 5—310)

Matter enclosed in heavy brackets [ ] appears in the original patent but forms no part of this reissue specification; matter printed in italics indicates the additions made by reissue.

This invention relates to a leg attachment for bed springs and more particularly for bed springs of the type normally supported in a bedstead.

An object of this invention is to provide an attachment for bed springs in the form of legs and clamping means carried by the legs whereby the usual bed frame may be eliminated and a bed formed out of the spring.

Another object of this invention is to provide an attachment for bed springs in the form of legs having clamping means for engagement with the round or angular side of the spring frame.

A further object of this invention is to provide a leg attachment which can be easily and quickly applied or removed with a minimum of tools.

With the above and other objects in view, the invention consists in the arrangement, combination and details of construction disclosed in the drawing and specification, and then more particularly pointed out in the appended claims.

Figure 1:
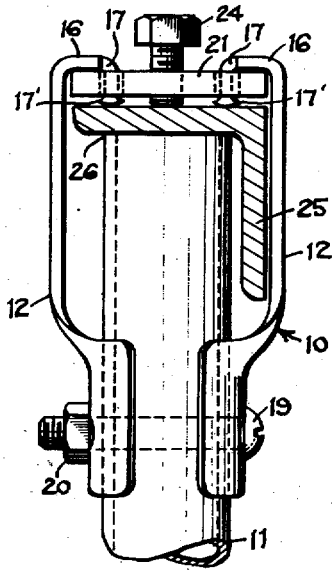
Figure 1 is an end elevation, partly in cross-section, of the leg with the clamping bracket shown clamped to an angle side member of a bed spring, parts of the structure being broken away.

Now referring to the drawings wherein like numerals indicate like parts throughout the several figures, the reference numeral 10 indicates, generally, the improved leg attachment for bed springs which consists of a tubular leg member 11 having a pair of clamp members 12 which are each provided with a semi-cylindrical portion 13 having an opening 14 extending centrally therethrough. The clamp member 12 has an integrally formed flat portion 15 extending upwardly from the semi-cylindrical portion 13.

A flange 16 extends inwardly at right angles to the flat portion 15 of the clamp member 12 and has a downwardly extending tang 17 projecting therefrom with the tang 17 parallel to the flat portion 15 with the lower end of the tang 17 provided with a head 17'.

The tubular leg member 11 is perforated at 18 and the clamp members 12 are secured to the leg member 11 by means of an attachment bolt 19 passed therethrough and secured therein by means of a nut 20.

The clamp members 12 are connected together at their top by means of a rectangular flat plate 21 which have a pair of apertures 22 extending therethrough which are adapted to receive the tangs 17 of the clamp member 12, the heads 17' being formed on the tangs 17 after they are inserted in the plate 21. At the opposed midpoints of the plate 21 a pair of threaded set screw receiving bores 23 are provided, and a pair of set screws 24 are threaded therethrough.

Now referring more specifically to Figure 1, the clamp 12 and leg 11 are shown attached to an angular side rail 25 which is received between the flat portions 15 of the clamp members 12 and has the top 26 of the tubular leg 11 engaged under the underside of the angular side rail 25. The set screws 24 are drawn down against the top side of the angular side rail 25 thus clamping the leg 11 to the side rail 25.

Figure 2:
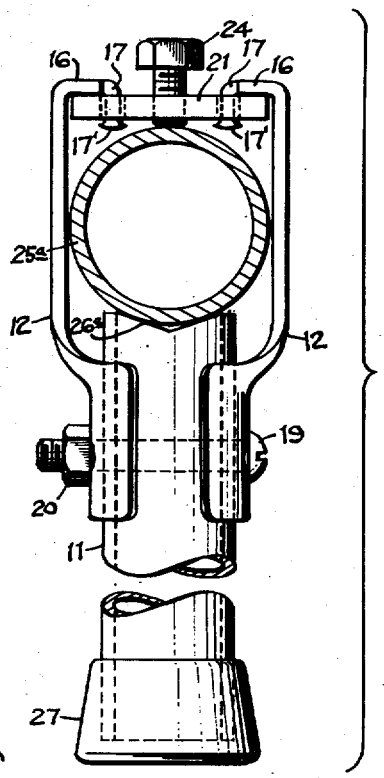
Figure 2 is an end elevation, partly in cross-section, of a modified form of the invention with a leg and clamping bracket attached to a tubular side rail of a bed spring, with parts of the structure being broken away.
Figure 4:
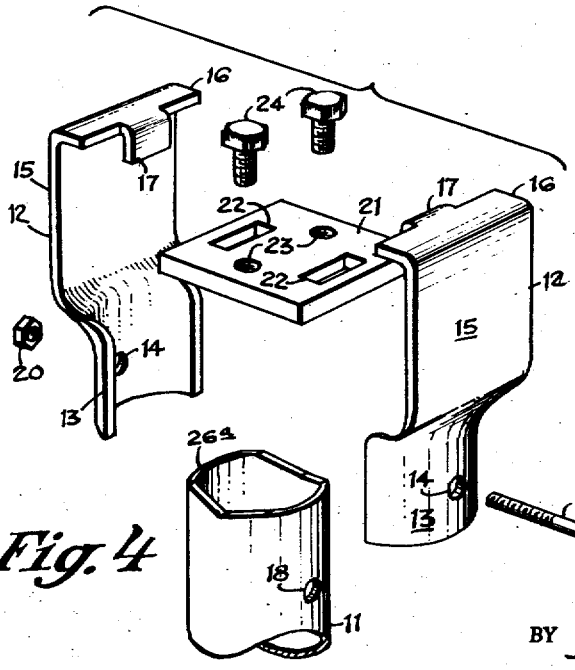
Figure 4 is an exploded perspective showing of the invention disclosed in Figure 2.

Now referring to Figure 2, the tubular leg 11 is formed with a V-shaped upper edge 26a to engage against the tubular side rail 25a.

Figure 3:
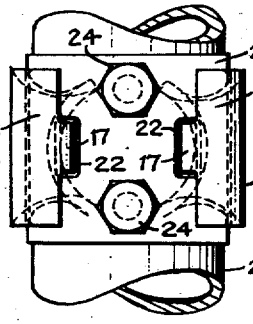
Figure 3 is a top plan view of the device illustrated in Figure 2 with parts broken away.

The remaining structure of the clamping device of the form disclosed in Figure 3 is the same as the structure of the device of the form disclosed in Figure 1 and the set screws 24 will bind the tubular member 25a against the edge 26a of the leg 11 thus clamping the leg 11 to the tubular member 25a.

Each of the legs 11 are provided with a cap 27 on the lower end thereof which may be formed of rubber or the like to prevent the leg 11 from gouging the floor upon which the bed rests.

Having thus described the preferred embodiments of the invention, it should be understood that numerous modifications and structural adaptations may be resorted to without departing from the scope of the appended claims.

What is claimed is:

*1.* In a bed spring of the type having a pair of side rails, a tubular leg at each corner of said spring, and a rail clamp at the upper end of each leg, said rail clamps each comprising a flat plate of generally rectangular configuration having a pair of spaced apart parallel slots extending vertically therethrough, a pair of identical opposed jaw members having an arcuate lower portion and an integral generally flat medial portion, an inwardly directed right angle flange integrally formed on the top edge of said medial portion, a tang depending perpendicularly from the inner edge of said flange and projecting through one of the slots in said flat plate, a head formed on the lower end of said tang for retaining said tang in said slot, clamping screws threadedly carried by said flat plate and adapted to engage said rail, and means detachably connecting the arcuate portions of said clamp member to said tubular leg.

*2. In a bed spring, a pair of side rails, a leg construction positioned at each corner of said bed spring and secured to one of said side rails, said leg construction comprising a bracket construction and a tubular leg, said bracket construction including opposed lower portions that are shaped to fit snugly around said tubular leg, an intermediate portion joined to each of said opposed lower portions, and an upper portion interconnecting said intermediate portions, means extending through said opposed lower portions and tubular leg for positively securing them together, whereby pivotal movement of said tubular leg with respect to said bracket construction is prevented, and means extending through said upper portion for securing said leg construction to a side rail.*

*3. In a bed spring, a pair of side rails, a leg construction positioned at each corner of said bed spring and secured to one of said side rails, said leg construction comprising a bracket construction and a leg, said bracket construction including opposed lower portions that are shaped to positively engage said leg, an intermediate portion joined to each of said opposed lower portions, and an upper portion interconnecting said intermediate portions, means for positively locking said opposed lower portions in engagement with said leg, thereby preventing pivotal*

*movement of said leg with respect to said bracket construction, and means extending through said upper portion for securing said leg construction to a side rail.*

*4. In a bed spring having a pair of side rails, a leg construction positioned at each corner of said bed spring and secured to one of said side rails, said leg construction comprising a tubular leg and a bracket construction secured to said tubular leg and to a side rail, said bracket construction including a pair of opposed jaws having an arcuate portion that snugly engages said tubular leg, an intermediate portion joined to each of said arcuate portions, and an upper portion interconnecting said intermediate portions, means extending through said arcuate*

*portions and tubular leg, whereby pivotal movement of said bracket construction with respect to said tubular leg is prevented, and means extending through said upper portion for securing said leg construction to said bed rail.*

References Cited in the file of this patent or the original patent

UNITED STATES PATENTS

| | | |
|---|---|---|
| 1,380,468 | Drew | June 7, 1921 |
| 2,501,878 | Shapiro | Mar. 28, 1950 |

FOREIGN PATENTS

| | | |
|---|---|---|
| 498,355 | Canada | Dec. 15, 1953 |